US012033790B2

(12) United States Patent
Park et al.

(10) Patent No.: US 12,033,790 B2
(45) Date of Patent: Jul. 9, 2024

(54) COIL COMPONENT

(71) Applicant: SAMSUNG ELECTRO-MECHANICS CO., LTD., Suwon-si (KR)

(72) Inventors: Myoung Soon Park, Suwon-si (KR); Sung Hee Kim, Suwon-si (KR); Han Kyeol Kim, Suwon-si (KR); Ji Young Park, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 611 days.

(21) Appl. No.: 17/220,438

(22) Filed: Apr. 1, 2021

(65) Prior Publication Data

US 2022/0181072 A1 Jun. 9, 2022

(30) Foreign Application Priority Data

Dec. 8, 2020 (KR) ........................ 10-2020-0170688

(51) Int. Cl.
*H01F 27/29* (2006.01)
*H01F 17/00* (2006.01)
*H01F 17/04* (2006.01)
*H01F 27/32* (2006.01)

(52) U.S. Cl.
CPC ....... *H01F 27/292* (2013.01); *H01F 17/0013* (2013.01); *H01F 17/04* (2013.01); *H01F 27/324* (2013.01); *H01F 2017/002* (2013.01); *H01F 2017/048* (2013.01)

(58) Field of Classification Search
CPC .... H01F 27/292; H01F 17/0013; H01F 17/04; H01F 27/324; H01F 2017/002; H01F 2017/048
See application file for complete search history.

(56) References Cited

U.S. PATENT DOCUMENTS

2015/0048915 A1* 2/2015 Yoon .................. H01F 17/0013 336/192
2016/0172103 A1* 6/2016 Jeong .................. H01F 27/255 29/605
2016/0343500 A1* 11/2016 Jung .................. H01F 41/042
2017/0032885 A1* 2/2017 Lee .................. H01F 41/046
(Continued)

FOREIGN PATENT DOCUMENTS

JP 5874199 B2 3/2016
KR 10-2017-0058006 A 5/2017
KR 20170097445 A * 8/2017

*Primary Examiner* — Malcolm Barnes
(74) *Attorney, Agent, or Firm* — Morgan, Lewis & Bockius LLP

(57) ABSTRACT

A coil component includes a body; first and second external electrodes; an insulating substrate; a first coil layer and a second coil layer disposed in the body; a third coil layer and a fourth coil layer disposed on a first surface and a second surface of the insulating substrate, respectively; a first terminal portion disposed on the first surface of the insulating substrate, and connected to the first external electrode; a first insulating layer covering the third coil layer and the first terminal portion; a second terminal portion disposed on the second surface of the insulating substrate, and connected to the second external electrode; a second insulating layer covering the fourth coil layer and the second terminal portion; and vias.

12 Claims, 5 Drawing Sheets

(56) References Cited

U.S. PATENT DOCUMENTS

| | | | | |
|---|---|---|---|---|
| 2017/0140866 | A1* | 5/2017 | Hong | H01F 41/10 |
| 2017/0169933 | A1* | 6/2017 | Kim | H01F 27/2871 |
| 2017/0330674 | A1* | 11/2017 | Lee | H01F 17/0013 |
| 2018/0033539 | A1* | 2/2018 | Yoon | H01F 27/2804 |
| 2018/0075965 | A1* | 3/2018 | Yoshioka | H01F 27/2823 |
| 2019/0013143 | A1* | 1/2019 | Kim | H01F 27/255 |
| 2019/0267182 | A1* | 8/2019 | Lee | H01F 17/04 |
| 2019/0355508 | A1* | 11/2019 | Lim | H01F 17/0013 |
| 2021/0043367 | A1* | 2/2021 | Yoshioka | H01F 27/2828 |

* cited by examiner

COIL COMPONENT

CROSS-REFERENCE TO RELATED APPLICATION (S)

The present application claims the benefit of priority to Korean Patent Application No. 10-2020-0170688, filed on Dec. 8, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in electronic devices along with a resistor and a capacitor.

As electronic devices such as smartphones have been designed to have high-performance and reduced sizes, an inductor, a coil component used in electronic devices, has also been required to implement high-performance and a reduced size.

Among such inductors, an inductor including a coil portion having a multilayer structure in which a plurality of coil layers are connected to each other by a via has been used.

In a general inductor having a multilayer structure, however, a terminal portion may be connected to a coil layer disposed on an outermost layer, and in this case, an area filled with a magnetic material may be reduced by an area equal to an area occupied by the terminal portion in the outermost layer, which may deteriorate a filling rate of the coil component.

SUMMARY

An aspect of the present disclosure is to provide a coil component having a multilayer coil portion, which may increase an area of a body filled with a magnetic material by improving a structure of a terminal portion.

According to an aspect of the present disclosure, a coil component includes a body; first and second external electrodes disposed on the body and spaced apart from each other; an insulating supporting member disposed in the body; a first coil layer and a second coil layer disposed in the body; a third coil layer and a fourth coil layer disposed on a first surface and a second surface of the insulating supporting member, respectively; a first terminal portion disposed on the first surface of the insulating supporting member, spaced apart from the third coil layer, and connected to the first external electrode; a first insulating layer covering the third coil layer and the first terminal portion; a second terminal portion disposed on the second surface of the insulating supporting member, spaced apart from the fourth coil layer, and connected to the second external electrode; and a second insulating layer covering the fourth coil layer and the second terminal portion. The first and second coil layers are disposed on the first and second insulating layers, respectively. The first terminal portion is connected to the first coil layer, the second terminal portion is connected to the second coil layer, the first coil layer is connected to the third coil layer, the third coil layer is connected to the fourth coil layer, and the fourth coil layer is connected to the second coil layer, through respective vias.

The coil component may further include at least one intermediate coil layer disposed between the third coil layer and the insulating supporting member or between the fourth coil layer and the insulating supporting member.

The first coil layer may have a first via pad to be connected to the first terminal portion through a via, and the first via pad has a thickness less than a thickness of other portions of the first coil layer by being in contact with the first insulating layer, and the second coil layer may have a second via pad to be connected to the second terminal portion through a via, and the second via pad has a thickness less than a thickness of other portions of the second coil layer by being in contact with the second insulating layer.

The vias may include a first via connecting the first terminal portion to the first coil layer; a second via connecting the second terminal portion to the second coil layer; a third via connecting the first coil layer to the third coil layer; a fourth via connecting the third coil layer to the fourth coil layer; and a fifth via connecting the fourth coil layer to the second coil layer.

The coil component may further include first and second plating lead wires exposed through one side surface of the body and disposed to be connected to the first and second coil layers, respectively, in the body.

The first and second external electrodes may include first and second conductive layers disposed on the body, and third and fourth conductive layers disposed on the first and second conductive layers, respectively.

The body may include a magnetic material and a resin.

A core may be disposed in a center of the body, and the core is filled with the magnetic material and the resin.

According to another aspect of the present disclosure, a coil component includes a body; first and second external electrodes disposed on the body and spaced apart from each other; an insulating supporting member disposed in the body; a first coil layer and a second coil layer disposed in the body; a third coil layer and a fourth coil layer disposed on a first surface and a second surface of the insulating supporting member, respectively; a first terminal portion disposed on the first surface of the insulating supporting member, spaced apart from the third coil layer, and connected to the first external electrode; a first insulating layer covering the third coil layer and the first terminal portion; a second terminal portion disposed on the second surface of the insulating supporting member, spaced apart from the fourth coil layer, and connected to the second external electrode; and a second insulating layer covering the fourth coil layer and the second terminal portion. The first and second coil layers are disposed on the first and second insulating layers, respectively. The first and second coil layers include first and second via pads connected to the first and second terminal portions through respective vias, respectively.

Each of the first and second via pads may have a thickness less than a thickness of other portions of the first and second coil layers, and the first and second via pads are in contact with the first and second insulating layers, respectively.

The first and second via pads may be in contact with the first and second external electrodes.

In a length direction in which the first and second terminal portions are exposed from the body, a length of each of the first and second via pads and a length of each of the first and second terminal portions may be larger than a line width of each turn of the first and second coil layers.

The coil component may further include a first via connecting the first terminal portion to the first coil layer; a second via connecting the second terminal portion to the second coil layer; a third via connecting the first coil layer to the third coil layer; a fourth via connecting the third coil layer to the fourth coil layer; and a fifth via connecting the fourth coil layer to the second coil layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
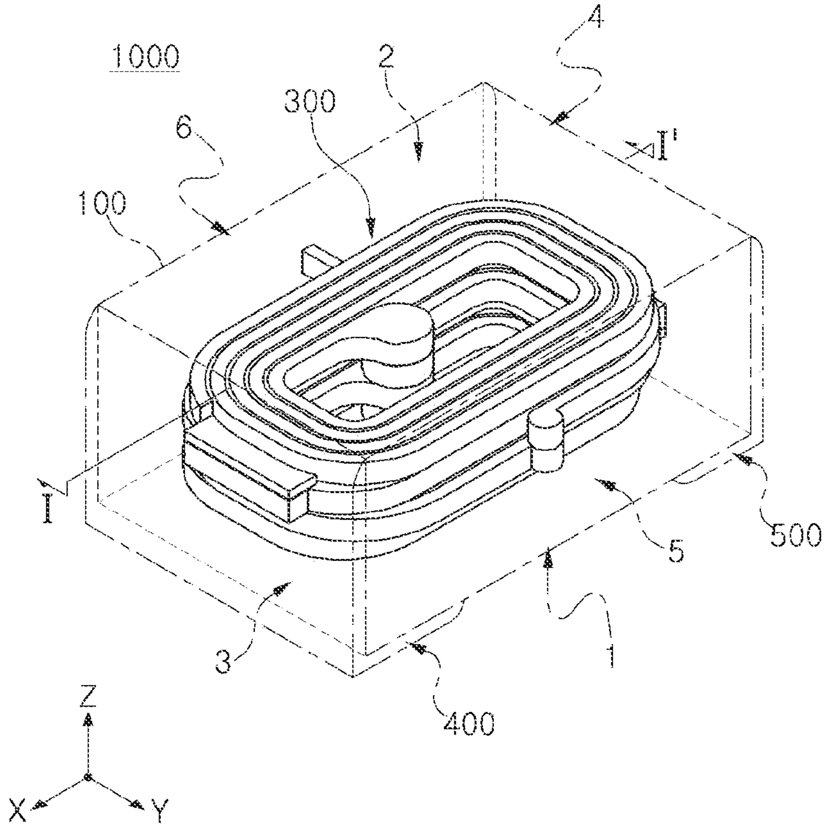
FIG. 1 is a perspective diagram illustrating a coil component according to an example embodiment of the present disclosure.

Hereinafter, embodiments of the present disclosure will be described as follows with reference to the attached drawings.

An expression used in the singular encompasses the expression of the plural, unless it has a clearly different meaning in the context.

Further, throughout the specification, it will be understood that when a portion "includes" an element, it may further include another element, not excluding another element, unless otherwise indicated.

In the example embodiment, the expression that an element is "disposed" on another element is not intended to set a direction. Accordingly, the expression that an element is "disposed" on another element may indicate that the element is disposed on an upper side of another element or on a lower side.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

Sizes and thicknesses in example embodiments in the drawings are merely examples to help understanding of technical matters of the present disclosure, and thus, are not limited thereto.

In the drawings, an X direction may be defined as a first direction or a length direction, a Y direction may be defined as a second direction or a width direction, and a Z direction may be defined as a third direction or a thickness direction.

In electronic devices, various types of electronic components may be used, and various types of coil components may be used between the electronic components to remove noise, or for other purposes.

In other words, in electronic devices, a coil component may be used as a power inductor, a high frequency inductor, a general bead, a high frequency bead, a common mode filter, or the like.

Figure 2:
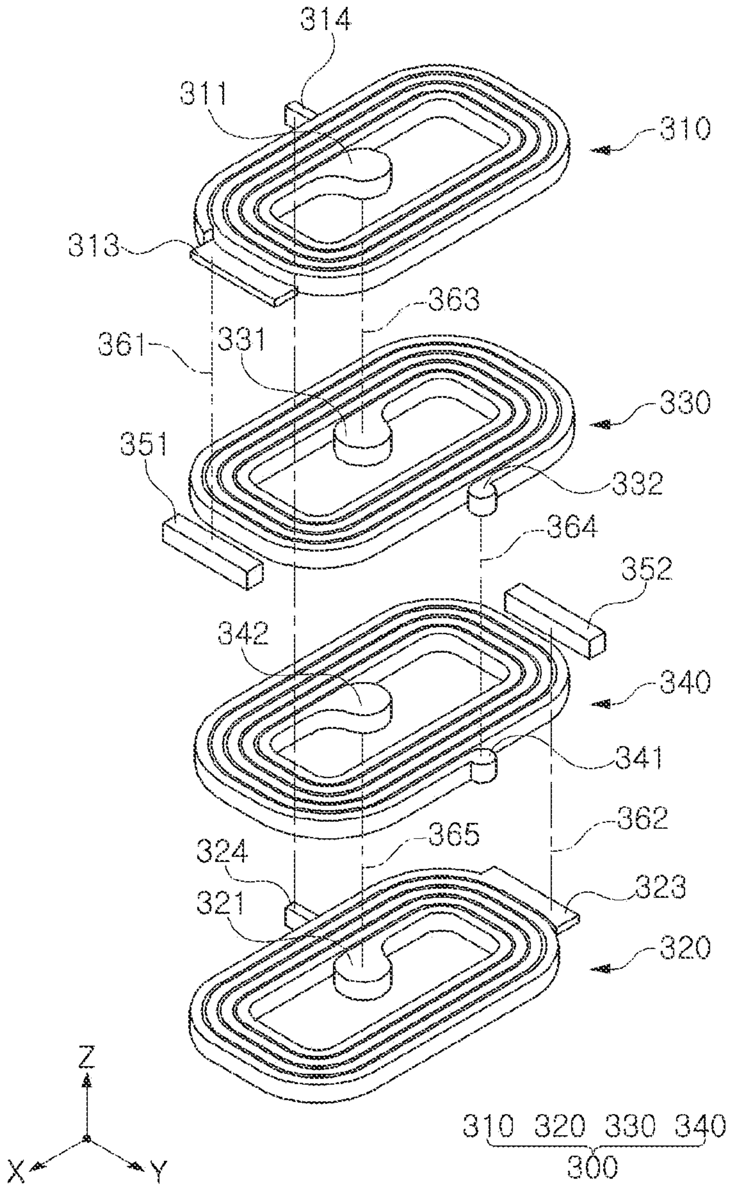
FIG. 2 is an exploded perspective diagram illustrating a connection structure of a coil portion, a terminal portion, and a via in the coil component illustrated in FIG. 1.
Figure 3:
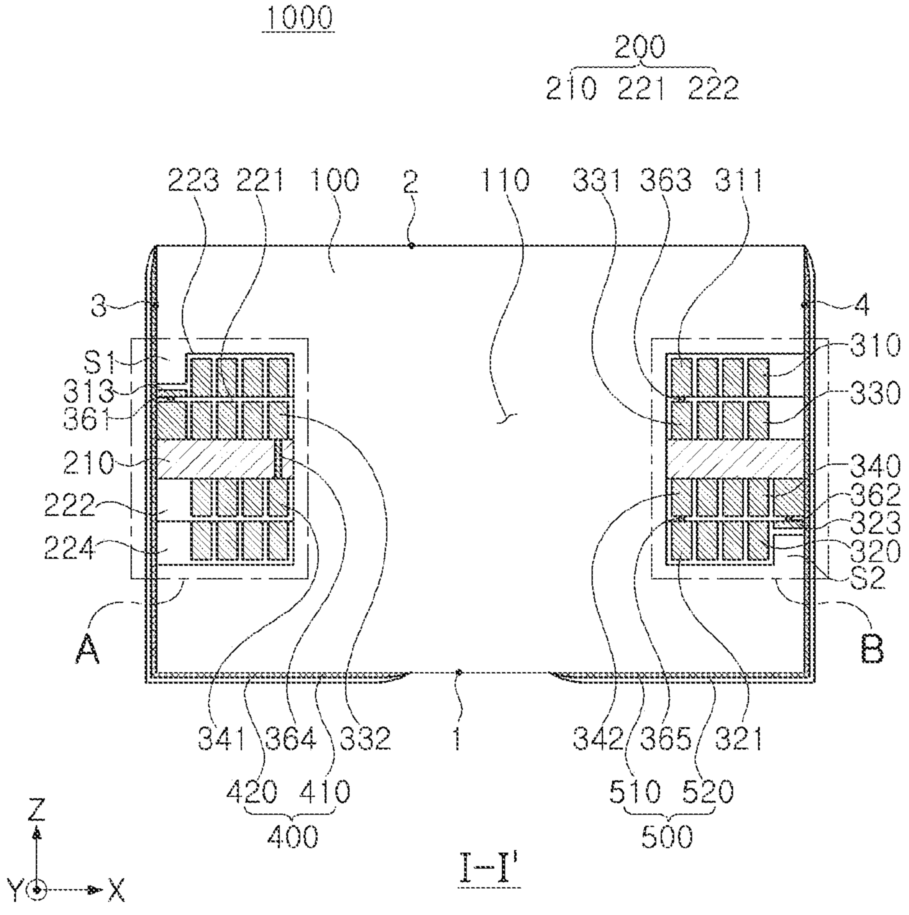
FIG. 3 is a cross-sectional diagram taken along line I-I' in FIG. 1.
Figure 4:
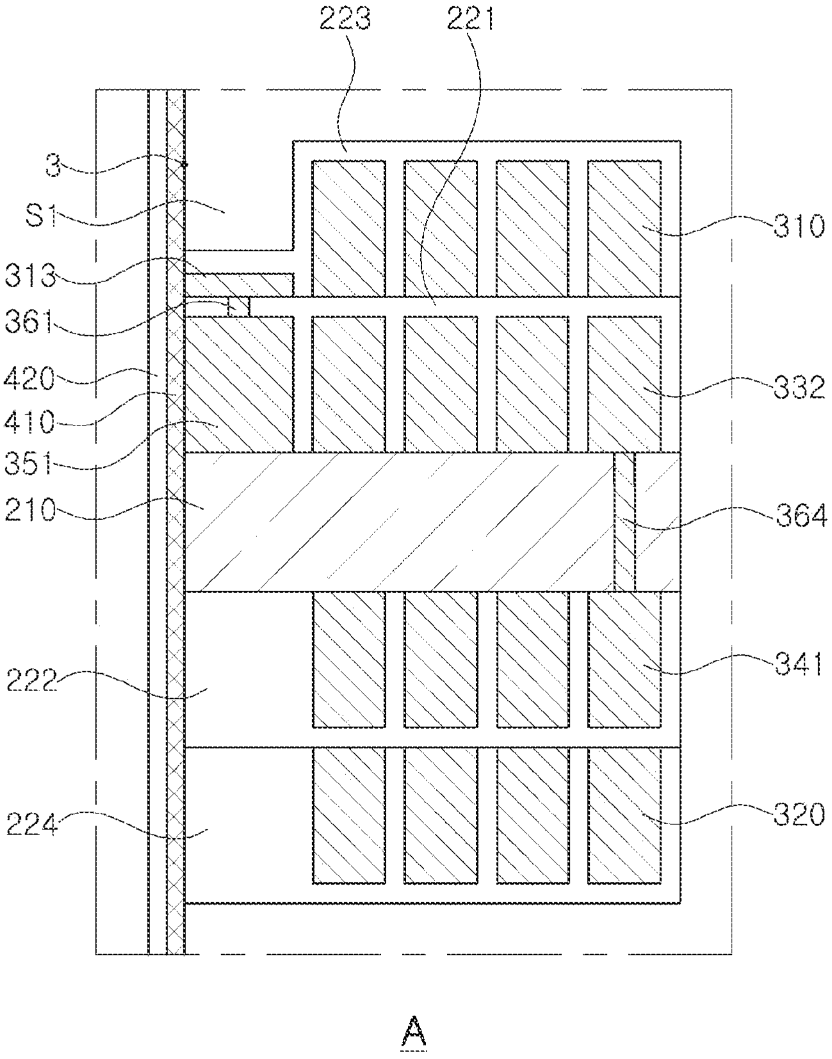
FIG. 4 is an enlarged diagram illustrating portion A illustrated in FIG. 3.
Figure 5:
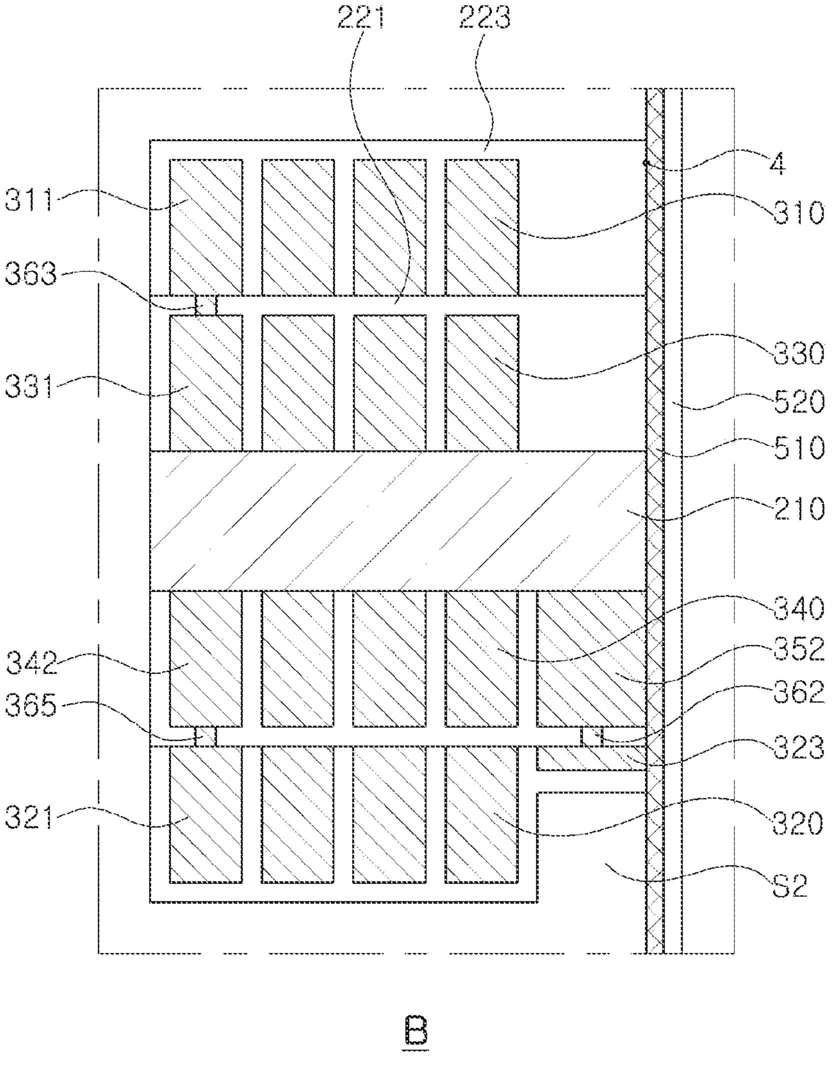
FIG. 5 is an enlarged diagram illustrating portion B illustrated in FIG. 3.

FIG. 1 is a perspective diagram illustrating a coil component according to an example embodiment. FIG. 2 is an exploded perspective diagram illustrating a connection structure of a coil portion, a terminal portion, and a via in the coil component illustrated in FIG. 1. FIG. 3 is a cross-sectional diagram taken along line I-I' in FIG. 1.

Referring to FIGS. 1 to 3, a coil component 1000 in an example embodiment may include a body 100, a coil portion 300, first and second external electrodes 400 and 500, an insulating supporting member 210, and first and second terminal portions 351 and 352.

The body 100 may form an exterior of the coil component 1000 in the example embodiment, and the coil portion 300 may be buried in the body 100.

The body 100 may have a hexahedral shape.

In the description below, an example embodiment will be described on the assumption that the body 100 has a hexahedral shape. However, an example embodiment does not exclude a coil component including a body having a shape other than a hexahedral shape.

Referring to FIGS. 1 and 2, the body 100 may include first and second surfaces 1 and 2 opposing each other in the Z direction, third and fourth surfaces 3 and 4 connected to the first and second surfaces 1 and 2 and opposing each other in the X direction, and fifth and sixth faces 5 and 6 connected to the first and second surfaces 1 and 2 and the third and fourth surfaces 3 and 4 and opposing each other in the Y direction.

When the coil component 1000 in the example embodiment is mounted on a mounting substrate such as a printed circuit board, the first surface 1 of the body 100 may be disposed to be directed to the mounting surface of the mounting substrate and may be a surface mounted on the mounting substrate.

The body 100 may include a magnetic material and resin. For example, the body 100 may be formed by layering one or more magnetic composite sheets including resin and a magnetic material dispersed in resin. Alternatively, the body 100 may have a structure different from the structure in which a magnetic material is dispersed in resin.

The magnetic material may be ferrite or a magnetic metal powder.

The ferrite may include, for example, one or more spinel ferrite materials such as an Mg—Zn ferrite, an Mn—Zn ferrite, an Mn—Mg ferrite, a Cu—Zn ferrite, an Mg—Mn—Sr ferrite, an Ni—Zn ferrite, and the like, a hexagonal ferrite such as a Ba—Zn ferrite, a Ba—Mg ferrite, a Ba—Ni ferrite, a Ba—Co ferrite, a Ba—Ni—Co ferrite, and the like, a garnet ferrite such as a Y ferrite, and a Li ferrite.

The magnetic metal powder may include one or more selected from a group consisting of iron (Fe), silicon (Si), chromium (Cr), cobalt (Co), molybdenum (Mo), aluminum (Al), niobium (Nb), copper (Cu), and nickel (Ni).

For example, the magnetic metal powder may be one or more of a pure iron powder, a Fe—Si alloy powder, a Fe—Si—Al alloy powder, a Fe—Ni alloy powder, a Fe—Ni—Mo alloy powder, Fe—Ni—Mo—Cu alloy powder, a Fe—Co alloy powder, a Fe—Ni—Co alloy powder, a Fe—Cr alloy powder, a Fe—Cr—Si alloy powder, a Fe—Si—Cu—Nb alloy powder, a Fe—Ni—Cr alloy powder, and a Fe—Cr—Al alloy powder.

The magnetic metal powder may be amorphous or crystalline. For example, the magnetic metal powder may be a Fe—Si—B—Cr amorphous alloy powder, but an example embodiment of the magnetic metal powder is not limited thereto.

Each particle of the ferrite and the magnetic metal powder may have an average diameter of 0.1 μm to 30 μm, but an example of the average diameter is not limited thereto.

The body 100 may include two or more types of magnetic materials dispersed in resin.

The notion that types of the magnetic materials are different may indicate that one of an average diameter, a composition, crystallinity, and a form of a magnetic material disposed in a resin is different from those of the other magnetic material(s).

The resin may include one of epoxy, polyimide, a liquid crystal polymer, or mixtures thereof, but the example of the resin is not limited thereto.

The body 100 may include a core 110 penetrating the coil portion 300 in a center. The core 110 may improve inductance of the coil component 1000.

The core 110 may be filled with a magnetic material and resin. For example, the core 110 may be formed by filling a through hole formed in the center of the coil portion 300 with a magnetic composite sheet, but an example embodiment thereof is not limited thereto.

The first and second external electrodes 400 and 500 may be disposed on the body 100 and may be spaced apart from each other.

The first external electrode 400 may include a first mounting portion disposed on the first surface 1 of the body 100, and a first connection portion bent in the Z direction on an end portion of the first mounting portion and disposed on the third surface 3 of the body 100.

The second external electrode 500 may include a second mounting portion disposed on the first surface 1 of the body 100 and spaced apart from the first mounting portion, and a second connection portion bent in the Z direction on an end portion of the second mounting portion and disposed on the fourth surface 4 of the body 100.

However, an example embodiment is not limited to the example in which the external electrodes 400 and 500 have an L-shaped shape, and the shape of the external electrode in the example embodiment may be varied if desired.

The first and second external electrodes 400 and 500 may be formed of a conductive material such as copper (Cu), aluminum (Al), silver (Ag), tin (Sn), gold (Au), nickel (Ni), lead (Pb), titanium (Ti), or alloys thereof, but an example of the material is not limited thereto.

Also, the first and second external electrodes 400 and 500 may include a plurality of layers.

The plurality of layers may be formed by applying and curing a conductive resin including conductive powder, or may be formed by a vapor deposition method such as sputtering, an electroless plating method, or an electroplating method.

In the example embodiment, the first and second external electrodes 400 and 500 may include first and second conductive layers 410 and 510 including copper (Cu), and third and fourth conductive layers 420 and 520.

The first and second conductive layers 410 and 510 may be formed by plating copper on the surface of the body 100, and the third and fourth conductive layers 420 and 520 may be formed by plating nickel and tin on the first and second conductive layers 410 and 510. In this case, the third and fourth conductive layers 420 and 520 may have a multilayer structure including a metal layer including nickel and a metal layer including tin.

The insulating supporting member 210 may be disposed in the central portion in the Z direction in the body 100. The insulating supporting member 210 may be formed of an insulating material including a thermosetting insulating resin such as an epoxy resin, a thermoplastic insulating resin such as a polyimide, or a photosensitive insulating resin, or may be formed of an insulating material including a reinforcing material such as a glass fiber or an inorganic filler with the above-described insulating resin.

For example, the insulating supporting member 210 may be formed of an insulating material such as a copper clad laminate (CCL), prepreg, Ajinomoto build-up film (ABF), FR-4, a bismaleimide triazine (BT) resin, a photoimageable dielectric (PID), and the like, but an example of the material of the internal insulating layer is not limited thereto.

As an inorganic filler, one or more materials selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

The coil portion 300 may be disposed in the body 100 and may exhibit properties of the coil component.

For example, when the coil component 1000 in the example embodiment is used as a power inductor, the coil portion 300 may store an electric field as a magnetic field and may maintain an output voltage, thereby stabilizing power of the electronic device.

The coil portion 300 may include a plurality of coil layers spaced apart from each other in the body 100, and in the example embodiment, the plurality of coil layers may be laminated in the Z direction, and the coil portion 300 may include first and second coil layers 310 and 320 on an outermost layer and third and fourth coil layers 330 and 340 on an internal layer.

When viewed in the Z direction, the first coil layer 310, the third coil layer 330, the fourth coil layer 340, and the second coil layer 320 may be disposed in order and may be spaced apart from one another.

Each of the first to fourth coil layers 310, 320, 330, and 340 may have a planar spiral shape in which at least one turn may be formed around the core 110 of the body 100.

The first to fourth coil layers 310, 320, 330, and 340 may be formed of a conductive material such as copper (Cu), aluminum (Al), silver (Ag), tin (Sn), gold (Au), nickel (Ni), lead (Pb), titanium (Ti), molybdenum (Mo) or alloys thereof, but an example of the material is not limited thereto.

The third coil layer 330 may be disposed on one surface of the insulating supporting member 210, a 3-1 via pad 331 for connecting a third via may be formed on one end portion of the coil, and a 3-2 via pad 331 for connecting a fourth via may be formed on the other end portion of the coil.

The fourth coil layer 340 may be disposed on the other surface of the insulating supporting member 210 to oppose the third coil layer 330, a 4-1 via pad 341 for connecting a fourth via may be formed on one end portion of the coil, and a 4-2 via pad 342 for connecting a fifth via may be formed on the other end portion of the coil.

Also, a first terminal portion 351 may be disposed on one surface of the insulating supporting member 210 and may be spaced apart from the third coil layer 330 in the X direction, and the first terminal portion 351 may be exposed to the third surface 3 of the body 100 and may be connected to the first external electrode 400.

In this case, the first terminal portion 351 may overlap the 1-1 via pad 313 of the first coil layer 310 in the Z direction.

A second terminal portion 352 may be disposed on the other surface of the insulating supporting member 210 and may be spaced apart from the fourth coil layer 340 in the X direction, and the second terminal portion 352 may be exposed to the fourth surface 4 of the body 100 and may be connected to the second external electrode 500.

In this case, the second terminal portion 352 may overlap the 2-1 via pad 323 of the second coil layer 320 in the Z direction.

Also, a first insulating layer 221 may be formed on one surface of the insulating supporting member 210 to cover the third coil layer 330 and the first terminal portion 351.

A second insulating layer 222 may be formed on the other surface of the insulating supporting member 210 to cover the fourth coil layer 340 and the second terminal portion 352.

The first and second insulating layers 221 and 222 may be formed of an insulating material including a thermosetting insulating resin such as an epoxy resin, a thermoplastic insulating resin such as a polyimide, or a photosensitive insulating resin, or may be formed of an insulating material including a reinforcing material such as a glass fiber or an inorganic filler with the above-described insulating resin.

The first coil layer 310 may be disposed on the first insulating layer 221, a 1-1 via pad 313 for connecting the first via for connection with the first terminal portion 351 may be formed on one end portion of the coil, and a 1-2 via pad 311 for connecting the third via may be formed on the other end portion of the coil.

In this case, the 1-1 via pad 313 may be formed to have a thickness less than a thickness of the other portion of the first coil layer 310, may be in close contact with the first insulating layer 221 in the Z direction, and may be attached to only a lower end of the first coil layer 310.

Accordingly, an upper portion of the 1-1 via pad 313 in the Z direction may work as a spatial portion additionally filled with a magnetic material.

The second coil layer 320 may be disposed on the second insulating layer 222, a 2-1 via pad 323 for connecting a second via for connection with the second terminal portion 351 may be formed on one end portion of the coil, and a 2-2 via pad 321 for connecting a fifth via may be formed on the other end portion of the coil.

In this case, the 2-1 via pad 323 may be formed to have a thickness less than a thickness of the other portion of the second coil layer 320, may be in close contact with the second insulating layer 222 in the Z direction, and may be attached to only an upper end of the second coil layer 320.

Accordingly, a lower portion of the 2-1 via pad 323 in the Z direction may work a spatial portion additionally filled with a magnetic material.

A third insulating layer 223 may be formed on one surface of the first insulating layer 221 to cover the first coil layer 310, and a fourth insulating layer 224 may be formed on one surface of the second insulating layer 222 to cover the second coil layer 320.

The third and fourth insulating layers 223 and 224 may be formed of an insulating material including a thermosetting insulating resin such as an epoxy resin, a thermoplastic insulating resin such as a polyimide, or a photosensitive insulating resin, or may be formed of an insulating material including a reinforcing material such as a glass fiber or an inorganic filler with the above-described insulating resin.

The first terminal portion 351 may be connected to the first coil layer 310, the second terminal portion 352 may be connected to the second coil layer 320, the first coil layer 310 may be connected to the third coil layer 330, the third coil layer 330 may be connected to the fourth coil layer 340, and the fourth coil layer 340 may be connected to the second coil layer 320 through respective vias 361 to 365.

The vias may be formed of a conductive material such as copper (Cu), aluminum (Al), silver (Ag), tin (Sn), gold (Au), nickel (Ni), lead (Pb), titanium (Ti), molybdenum (Mo) or alloys thereof, but an example of the material is not limited thereto.

In the example embodiment, the vias may include first to fifth vias.

The first via 361 may be formed on the first insulating layer 221 to vertically connect the first terminal portion 351 to the 1-1 via pad 313 of the first coil layer 310.

The second via 362 be formed on the second insulating layer 222 to vertically connect the second terminal portion 352 to the 2-1 via pad 323 of the second coil layer 320.

The third via 363 may be formed on the first insulating layer 221 to vertically connect the 1-2 via pad 311 of the first coil layer 310 to the 3-1 via pad 331 of the third coil layer 330.

The fourth via 364 may be formed on the insulating supporting member 210 to vertically connect the 3-2 via pad 332 of the third coil layer 330 to the 4-1 via pad 341 of the fourth coil layer 340.

The fifth via 365 may be formed on the second insulating layer 222 to vertically connect the 4-2 via pad 342 of the fourth coil layer to the 2-2 via pad 321 of the second coil layer 320.

By including the connection structure of the terminal portion, the coil portion, and the via, a series connection structure in which, when power is applied (In) from the first external electrode 400 to the first terminal 351, the power flows and is discharged (Out) through the first via 361, the 1-1 via pad 313, the first coil layer 310, the 1-2 via pad 311, the third via 363, the 3-1 via pad 331, the third coil layer 330, the 3-2 via pad 332, the fourth via 364, the 4-1 via pad 341, the fourth coil layer 340, the 4-2 via pad 342, the fifth via 365, the 2-2 via pad 321, the second coil layer 320, the 2-1 via pad 323, the second terminal portion 352, and the second external electrode 500, and the coil portion 300 may function as a single coil.

The coil layer and via in the example embodiment may be formed by plating. Each of the coil layer and via may include a seed layer formed by vapor deposition such as electroless plating or sputtering, and an electroplating layer.

The electrolytic plating layer may have a single layer structure or a multilayer structure. The electrolytic plating layer having a multilayer structure may be formed in conformal film structure in which an electrolytic plating layer is covered by another electrolytic plating layer, or a structure in which an electrolytic plating layer is only layered on one surface of one of the electrolytic plating layers.

The seed layers of the coil layer and the via may be integrated with each other such that a boundary may not be formed therebetween, but an example embodiment thereof is not limited thereto.

In the example embodiment, in the body 100, first and second plating lead wires 314 and 324 may be disposed to be connected to the first and second coil layers 310 and 320, respectively, for plating. In this case, the first and second plating lead wires 314 and 324 may be exposed through the sixth surface 6 of the body 100.

The coil portion 300 may further include at least one intermediate coil layer (not illustrated) layered in the Z direction between third coil layer 330 and the insulating supporting member 210, or between the fourth coil layer 340 and the insulating supporting member 210, if desired.

In this case, a via for connecting the third or fourth coil layers 330 and 340 to the intermediate coil layer may be further included in the body 100, and when two or more intermediate coil layers are provided, a via for connecting the intermediate coil layers to each other may be further included in the body 100.

In a generally used a coil component having a multilayer structure, a terminal portion may be formed by being connected to a coil layer of an outermost layer. In this case, an area filled with a magnetic material may be reduced by an area equal to an area occupied by the terminal portion, which may degrade inductance properties of the coil component.

However, in the coil component 1000 in the example embodiment, the first and second terminal portions 351 and 352 may be formed on both surfaces of the insulating supporting member 210, which may be an internal layer of the body 100, such that first and second terminal portions on an external layer may not be provided, differently from the generally used structure in which the first and second terminal portions are formed on an external layer, and a spatial portion corresponding to the areas of the first and second terminal portions may be arranged. Accordingly, the body 100 may be further filled with a magnetic material, and inductance properties of the coil component 1000 may improve.

Also, in the example embodiment, the 1-1 via pad 313 connected to the first terminal portion 351 through the first via 361 in the first coil layer 310, an uppermost layer of the coil portion 300, may have a thickness less than a thickness of the other portion of the first coil layer 310, and may be attached to only the lower end of the first coil layer 310 in the Z direction.

Also, the 2-1 via pad 323 connected to the second terminal portion 352 through the second via 362 in the second coil layer 320, a lowermost layer of the coil portion 300, may have a thickness less than a thickness of the other portion of the second coil layer 320, and may be attached to only the upper end of the second coil layer 320.

In the generally used coil component, the portion in which the first and second terminal portions are disposed may correspond to the position in which the 1-1 via pad 313 and the 2-1 via pad 323 are formed in the example embodiment. In the example embodiment, the upper portion of the 1-1 via pad 313 and the lower portion of the 2-1 via pad 323 in the Z direction may work spatial portions, and an area filled with a magnetic material may be additionally secured through the spatial portions. Accordingly, inductance of the coil component 1000 may improve.

According to the aforementioned example embodiment, in a coil component having a coil portion having a multilayer structure, the terminal portion may be formed on an internal layer of the body, such that a magnetic material may be further filled as much as an area corresponding to the terminal portion, differently from the generally used structure in which the terminal portion is formed on the external layer of the body. Accordingly, inductance of the coil portion may improve.

While the example embodiments have been illustrated and described above, it will be apparent to those skilled in the art that modifications and variations could be made without departing from the scope of the present invention as defined by the appended claims.

What is claimed is:

1. A coil component, comprising:

a body;

first and second external electrodes disposed on the body and spaced apart from each other;

an insulating supporting member disposed in the body;

a first coil layer and a second coil layer disposed in the body;

a third coil layer and a fourth coil layer disposed on a first surface and a second surface of the insulating supporting member, respectively;

a first terminal portion disposed on the first surface of the insulating supporting member, spaced apart from the third coil layer, and connected to the first external electrode;

a first insulating layer covering the third coil layer and the first terminal portion;

a second terminal portion disposed on the second surface of the insulating supporting member, spaced apart from the fourth coil layer, and connected to the second external electrode; and a second insulating layer covering the fourth coil layer and the second terminal portion, wherein the first and second coil layers are disposed on the first and second insulating layers, respectively, and wherein the first terminal portion is connected to the first coil layer, the second terminal portion is connected to the second coil layer, the first coil layer is connected to the third coil layer, the third coil layer is connected to the fourth coil layer, and the fourth coil layer is connected to the second coil layer, through respective vias, wherein the vias include a first via connecting the first terminal portion to the first coil layer; a second via connecting the second terminal portion to the second coil layer; a third via connecting the first coil layer to the third coil layer; a fourth via connecting the third coil layer to the fourth coil layer; and a fifth via connecting the fourth coil layer to the second coil layer.

2. The coil component of claim 1, wherein the first coil layer has a first via pad to be connected to the first terminal portion through a via, and the first via pad has a thickness less than a thickness of other portions of the first coil layer by being in contact with the first insulating layer, and wherein the second coil layer has a second via pad to be connected to the second terminal portion through a via, and the second via pad has a thickness less than a thickness of other portions of the second coil layer by being in contact with the second insulating layer.

3. The coil component of claim 1, further comprising:

a third insulating layer covering the first coil layer; and a fourth insulating layer covering the second coil layer.

4. The coil component of claim 1, further comprising first and second plating lead wires exposed through one side surface of the body and disposed to be connected to the first and second coil layers, respectively, in the body.

5. The coil component of claim 1, wherein the first and second external electrodes include first and second conductive layers disposed on the body, and third and fourth conductive layers disposed on the first and second conductive layers, respectively.

6. The coil component of claim 1, wherein the body includes a magnetic material and a resin.

7. The coil component of claim 6, wherein a core is disposed in a center of the body, and the core is filled with the magnetic material and the resin.

8. A coil component, comprising:

a body;

first and second external electrodes disposed on the body and spaced apart from each other;

an insulating supporting member disposed in the body;

a first coil layer and a second coil layer disposed in the body;

a third coil layer and a fourth coil layer disposed on a first surface and a second surface of the insulating supporting member, respectively;

a first terminal portion disposed on the first surface of the insulating supporting member, spaced apart from the third coil layer, and connected to the first external electrode;

a first insulating layer covering the third coil layer and the first terminal portion;

a second terminal portion disposed on the second surface of the insulating supporting member, spaced apart from the fourth coil layer, and connected to the second external electrode; and a second insulating layer covering the fourth coil layer and the second terminal portion, wherein the first and second coil layers are disposed on the first and second insulating layers, respectively, and wherein the first and second coil layers include first and second via pads connected to the first and second terminal portions through respective vias, respectively, further comprising:

a first via connecting the first terminal portion to the first coil layer; a second via connecting the second terminal portion to the second coil layer; a third via connecting the first coil layer to the third coil layer; a fourth via connecting the third coil layer to the fourth coil layer; and a fifth via connecting the fourth coil layer to the second coil layer.

9. The coil component of claim 8, wherein each of the first and second via pads has a thickness less than a thickness of other portions of the first and second coil layers, and the first and second via pads are in contact with the first and second insulating layers, respectively.

10. The coil component of claim 8, wherein the first and second via pads are in contact with the first and second external electrodes.

11. The coil component of claim 8, wherein, in a length direction in which the first and second terminal portions are exposed from the body, a length of each of the first and second via pads and a length of each of the first and second terminal portions are larger than a line width of each turn of the first and second coil layers.

12. The coil component of claim 8, further comprising first and second plating lead wires exposed through one side surface of the body and disposed to be connected to the first and second coil layers, respectively, in the body.

* * * * *